United States Patent Office 3,723,089
Patented Mar. 27, 1973

3,723,089
METHOD OF CONTROLLING WEEDS WITH ORGANOTIN COMPOUNDS
Donald J. Peterson, Springfield Township, Hamilton County, Ohio, assignor to The Procter & Gamble Company, Cincinnati, Ohio
No Drawing. Filed Mar. 26, 1970, Ser. No. 23,019
Int. Cl. A01n 9/22
U.S. Cl. 71—94                   6 Claims

ABSTRACT OF THE DISCLOSURE

Disclosed herein are compositions and a method for controlling the growth of weeds by contacting weeds with a growth-controlling amount of certain N,N-disubstituted aminomethyl trialkyl tin compounds or quaternary ammonium salts thereof.

BACKGROUND OF THE INVENTION

The control of weeds is of extreme importance in all phases of agriculture. Weeds, as defined herein, are undesirable plants in that they grow where they are not wanted, have no economic value and interfere with the production of cultivated crops. Many types of weeds are known including annuals such as pigweed, lambsquarters, foxtail, crabgrass, wild mustard, field pennycress, ryegrass, goosegrass, chickweed, wild oats, velvet leaf, purselane, barnyard grass, knotweed, cocklebur, wild buckwheat, kochia, medic and smartweed; biennials such as wild carrot, great burdock, mullien, round leaved mallow, blue thistle, bull thistle; or perennials such as white cockle, dandelion, campanula, perennial ryegrass, quackgrass, Johnson grass, Canada thistle, hedge bindweed, Bermuda grass, sheep sorrel, curly dock, nutgrass, field chickweed and winter-cress. The presence of such weeds in commercial crops results in soil lacking in vital nutrients, thus resulting in lower quality crops than would otherwise be obtained.

In order to control such weeds, the farmer has in the past had to rely on time consuming, constant cultivation of the soil. More recently he has been able to find considerable relief through the periodic application of herbicidal compositions. Some such compositions are of the pre-emergent type, i.e. they are applied to the soil before growth starts and they prevent the germination of the seeds of weed plants. This type must be highly selective in controlling the growth of undesirable weeds, and not interfere with the growth of useful plants. Other compositions are of the post-emergent or contact type which are applied to the above-ground portions of growing plants. While it is desirable that these latter compositions also be highly selective in controlling the growth of weeds and not interfere with the growth of useful plants, this property is not as important as in the case of pre-emergent type compositions, since it is possible to apply post-emergent types selectively to the weeds while avoiding contact with useful plants. Still other compositions can be applied either as pre-emergent or post-emergent herbicides. Continuing effort in the herbicidal art is being directed toward the development of herbicidies which have both pre- and post-emergent activity and also have high selectivity for weeds.

DETAILED DESCRIPTION OF THE INVENTION

It is an object of the invention to provide improved compositions and a method for controlling (i.e. preventing, suppressing, or inhibiting) the growth of undesirable weeds.

It is a further object of the present invention to provide compositions and a method for controlling the growth of weeds by pre-emergent application of herbicidal compounds without having any appreciable deleterious effect on the growth of desirable crops.

Other objects of the invention will become apparent from the following description.

According to the present invention it has been discovered that the growth of weeds can be controlled (i.e. prevented, suppressed or inhibited) by contacting the said weeds with a growth-controlling amount of certain organotin compounds. It has further been found that the selectivity of some of these compounds in controlling weeds, rather than useful plants, is excellent when applied to the pre-emergent seeds. The organotin compounds used in the present invention have the following general formulas:

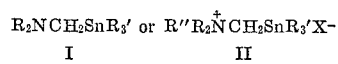

wherein each R is a straight or branched chain, saturated or unsaturated aliphatic group (e.g. alkyl and alkenyl), having from 1 to about 14 carbon atoms, preferably from 1 to about 6 carbon atoms, or both R's taken together form a heterocyclic ring containing from 4 to 7 carbon atoms; R' is a straight or branched chain, saturated or unsaturated aliphatic group, (e.g. alkyl or alkenyl) having from 1 to about 14 carbon atoms, preferably from 1 to about 6 carbon atoms, R" is hydrogen or a straight or branched chain saturated or unsaturated aliphatic group (e.g. alkyl or alkenyl) having from 1 to about 14 carbon atoms, preferably from 1 to about 6 carbon atoms, and X is a salt forming anion, e.g. halide, bisulfate, nitrate or acetate.

Compound I is an N,N-disubstituted aminomethyl trialkyl tin compound and Compound II is an N,N-disubstituted or N,N,N-trisubstituted ammoniomethyl trialkyl tin salt, (i.e. Type II is disubstituted if R" is hydrogen, and it is trisubstituted if R" is alkyl). When the R groups of Compounds I or II are combined into a heterocyclic ring, Compounds I and II become cyclopolymethyleneaminomethyl trialkyl tin and cyclopolymethyleneammonio trialkyl tin salts, respectively, and have the following general formulas:

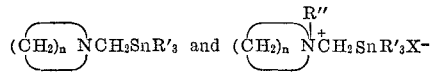

where $n=4-7$.

Specific examples of compounds of Type I are N,N-dimethylaminomethyl tributyl tin, cyclopentamethyleneaminomethyl tributyl tin, N,N-diethylaminomethyl tri-isopropyl tin, N,N-di-isopentylaminomethyl tripropyl tin, N,N-dibutylaminomethyl trioctyl tin, N,N-dihexylaminomethyl tridodecyl tin, N,N-didodecylaminomethyl trihexyl tin, N,N-diethylaminomethyl tri-(3-pentenyl)tin and N,N-dipropenylaminomethyl triethyl tin. Preferred compounds of Type I are N,N-dimethylaminomethyl tributyl tin and cyclopentamethyleneaminomethyl tributyl tin. Examples of compounds of Type II are: N,N-dimethylammoniomethyl tributyl tin hydrochloride, cyclopentamethyleneammoniomethyl tributyl tin hydrochloride, N-methylcyclopentamethyleneammoniomethyl tributyl tin bromide, N,N,N-triethylammoniomethyl tri-isopropyl tin chloride, N,N,N-tributylammoniomethyl trioctyl tin bisulfate, N,N-di-isopentylammoniomethyl tri-isopropyl tin hydrobromide, N,N,N-trihexylammoniomethyl tridodecyl tin bromide, N,N-didodecylammoniomethyl trihexyl tin hydrochloride, N,N,N-triethylammoniomethyl tri-(3-pentenyl) tin chloride. Preferred compounds of Type II are N,N-dimethylammoniomethyl tributyl tin hydrochloride, N-methylcyclopentamethyleneammoniomethyl tributyl tin bromide and cyclopentamethyleneammoniomethyl tributyl tin hydrochloride.

The organotin compounds utilized in the present invention can be made by known methods. For example, compounds of Type I can be made by a process described in Journal of Organometallic Chemistry, vol. 21, No. 2, 1970, pp. 63–64. According to this process, trialkyl tin chloride is reacted with lithium to form trialkyltinlithium ($R_3SnLi$). This compound, in turn, is reacted in tetrahydrofuran with (N,N-dialkylaminomethyl) phenyl sulfide according to the following reaction to obtain the N,N-disubstituted aminomethyl trialkyl tin compound of Type I.

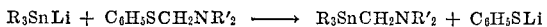

If the phenyl sulfide is a cyclopolymethyleneaminomethyl phenyl sulfide the resulting tin compound has the general formula

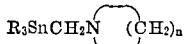

The compounds of Type I can be converted to the N,N-disubstituted ammoniomethyl trialkyl tin salts of Type II by reaction with a salt forming acid such as hydrochloric acid or they can be converted into the N,N,N-trisubstituted ammoniomethyl trialkyl tin compounds of Type II by reaction with an alkyl halide.

Compounds of Type I have been found to exhibit excellent pre-emergence and post-emergence growth control of weeds, and thus can be applied to either the seeds (e.g. by applying to the ground before growth begins) or the above-ground portions of growing weed plants. Hereinafter, when referring to the contacting of weeds with compounds of Type I, it will be understood that the term "weeds" includes both the seeds and the above-ground portions of growing weed plants.

Compounds of Type II have been found to exhibit excellent post-emergence growth control of weeds but exhibit very little growth control in pre-emergent applications. Thus compounds of Type II should be used only in post-emergence applications. Hereinafter, when referring to contacting of weeds with compounds of Type II, it will be understood that the term weeds refers only to the above-ground portions of growing weed plants.

In accordance with the present invention, weeds are contacted with the organotin compounds described herein in amounts sufficient to achieve the desired degree of weed control. The required dosage depends upon many factors such as method of application, type and quantity of weeds, duration of treatment, climatic conditions, etc. Application rates of 1 to about 50 pounds of organotin compound per acre are usually satisfactory, but higher rates may also be used. Preferably the application rate is about 1 to 30 lbs. per acre. The organotin compounds herein may be applied singly or in combinations with each other and/or in combination with other materials as more fully described hereinafter.

For practical use as herbicides, the organotin compounds of this invention are generally incorporated into herbicidal compositions which comprise an inert carrier and a growth controlling amount of one or more of the organotin compounds. (As used herein an inert carrier is defined as a solvent or a dry bulking agent which has no herbicidal effectiveness but which provides a means whereby the organotin compounds can be diluted for convenient application.) Such herbicidal compositions enable the organotin compounds to be applied conveniently to the site of the weed infestation in any desired quantity. These compositions can be solids, such as dusts, granules or wettable powders, or they can be liquids such as solutions, aerosols, or emulsifiable concentrates. The solid compositions generally contain from about 1% to about 95% by weight of the organotin compounds and the liquid compositions generally contain from about 0.5 to about 70% by weight of said compounds.

Dusts can be prepared by grinding and blending the organotin compounds with a solid inert carrier such as talcs, clays, silicas, pyrophylite and the like. Granular formulations can be prepared by impregnating the organotin compounds, usually dissolved in a suitable solvent, onto and into granulated carriers such as the attapulgites or the vermiculites, usually of a particle size range of from about 0.3 to 1.5 mm., or by coating an inert carrier with a wettable powder formulation of the compounds. Wettable powders, which can be dispersed in water or oil to any desired concentration of the organotin compounds, can be prepared by incorporating wetting agents into concentrated dust compositions or by simply mixing the ingredients in the case of some of the organotin salts.

Some of the organotin compounds of the present invention are sufficiently soluble in water or the common organic solvents such as kerosene, xylene, Stoddard solvent, acetone, and the like, that they can be used directly as solutions in these solvents. Frequently, these solutions of herbicide can be dispersed under super-atmospheric pressure as aerosols. However, preferred liquid herbicidal compositions for the practice of the invention herein are emulsifiable concentrates which comprise the organotin compound, an emulsifier, and, as an inert carrier, a solvent. Such concentrates can be extended with water and/or oil to any desired concentration of the organotin herbicide for application as sprays to the site of weed infestation. The emulsifiers used in these concentrates are surface active agents of the anionic, nonionic, cationic, ampholytic or zwitterionic type and normally comprise from about 0.1% to 30% by weight of the concentrate. Examples of suitable anionic surface active agents are sodium salts of fatty alcohol sulfates having from 8–18 carbon atoms in the fatty chain and sodium salts alkyl benzene sulfonates, having from 9 to 15 carbon atoms in the alkyl chain. Examples of suitable nonionic surface active agents are the polyethylene oxide condensates of alkyl phenols, wherein the alkyl chain contains from about 6 to 12 carbon atoms and the amount of ethylene oxide condensed onto each mole of alkyl phenol is from about 5 to 25 moles. Examples of suitable cationic surface active agents are dimethyl dialkyl quaternary ammonium salts wherein the alkyl chains contain from about 8 to 18 carbon atoms and the salt forming anion is a halogen. Examples of suitable ampholytic surface active agents are derivatives of aliphatic secondary or tertiary amines in which one of the aliphatic substituents contains from about 8 to 18 carbon atoms and one contains an anionic water solubilizing group, e.g. sulfate or sulfo. Specific suitable ampholytic surface active agents are sodium-3-dodecylaminopropionate and sodium-3-doecyl amino propane sulfonate. Examples of suitable zwitterionic surface active agents are derivatives of aliphatic quaternary ammonium compounds in which one of the aliphatic constituents contains from about 8 to 18 carbon atoms and one contains an anionic water solubilizing group. Specific examples of zwitterionic surface active agents are 3-(N,N-dimethyl-N-hexadecylammonio)-propane-1-sulfonate and 3-(N,N-dimethyl-N-hexadecylammonio) - 2 - hydroxy propane-1-sulfonate. Many other suitable surface active agents are described in Detergents and Emulsifiers—1969 Annual by John W. McCutcheon Inc. which is incorporated by reference herein. Suitable solvents for these emulsifiable concentrates include hydrocarbons such as benzene, toluene, xylene, kerosene and Stoddard Solvent and halogenated hydrocarbons such as chlorobenzene, chloroform, fluorotrichloromethane and dichlorodifluoromethane.

The compounds of the present invention are also useful when combined with other herbicides, and/or defoliants, dessicants and the like in the herbicidal compositions heretofore mentioned. These other materials can comprise from about 5% to about 95% of the total active ingredients in the herbicidal compositions. Use of combinations of these other herbicides and/or defoliants, desiccants etc. with the compounds of the present invention provides herbicidal compositions which are more effective in controlling weeds and ofter provide results unattainable with separate compositions of the individual herbicides. The other herbicides, defoliants, desiccants etc. which can be used with the organotin compounds of this invention to control weeds include chlorophenoxy herbicides such as 2,4-D, 2,4,5-T, MCPA, MCPB, 4(2,4-DB) and the like; carbamate herbicides such as IPC, CIPC, swop, barban, and the like; thiocarbamate and dithiocarbamate herbicides such as CDEC, methane sodium, EPTC, diallate, PEBC, and the like; substituted urea herbicides such as dichloral urea, fenuron, monuron, diuron, linuron, neburon, and the like; symmetrical triazine herbicides such as simazine, chlorazine, atrazine, trietazine, simetone, prometone, propazine, ametryne, and the like; chloroacetamide herbicides such as alpha-chloro-N,N-dimethyl-acetamide, CDEA, alpha-chloro-N-isopropylacetamide, 4 - (chloroacetyl)morpholine, 1 - (chloroacetyl) piperidine, and the like; chlorinated aliphatic acid herbicides such as TCA, dalapon, 2,3-dichloropropionic acid, and the like, chlorinated benzoic acid and phenylacetic acid herbicides such as 2,3,6-TBA, 2,3,5,6-TBA, dicamba, tricamba, amiben, fenac, 2-methoxy-3,6-dichlorophenylacetic acid, 3-methoxy-2,6-dichlorophenylacetic acid, 2-methoxy-3,5,6-trichlorophenylacetic acid, and the like; and such compounds as aminotriazole, maleic hydrazide, phenyl mercuric acetate, endothal, biuret, technical chlordane, diquat, erbon, DNC, DNBP, dichlebenil; DPA, diphenamid, dipropalin, trifluralin, solan, dicryl, merphos, DMPA and the like. Such herbicides can also be used in the methods and compositions of this invention in the form of their salts, esters, amides, and other derivatives whenever applicable to the particular parent compounds.

In addition to its high effectiveness in controlling weeds, the method of the present invention has an additional benefit in that the organotin compounds used herein also provide some control of insects at the levels used for weed control. Although generally not as effective as commonly used insecticides, such as Malathion in this respect, they do exhibit a demonstrable level of insect control when used in the method of the present invention.

The invention will be illustrated by the following examples.

Example I

Compounds of Type I were tested according to the method of the present invention, using the following experimental technique, and using 2,4-D, (2,4-dichlorophenoxyacetic acid), dacthal(dimethyl tetrachloroterephthalate) and no treatment as controls.

The herbicidal compounds were dissolved in acetone containing an emulsifier combination of Span 85 (sorbitan trioleate) and Tween 80 (polyoxyethylene sorbtan monooleate). These emulsifiers were used at a level such that the finished spray formulations contained 500 p.p.m. Span 85 and 125 p.p.m. Tween 80. The formulations were applied with a Devilbiss atomizer operating at 6 p.s.i. pressure and delivering 50 ml. of formation on both pre- and post-emergence tests.

In the pre-emergence tests duplicate paper pots, filled with a soil mixture were seeded at a depth of one-half inch with snap beans, cotton, corn, wheat, mustard, pigweed, crabgrass and foxtail. Immediately after seeding the soil was sprayed with formulation. Growth was permitted to occur under artificial light with overhead irrigation. The plants were observed for about 10 days and an injury rating was given in comparison with the untreated controls.

In the post-emergence tests duplicate paper pots filled with vermiculite were seeded at a depth of one-half inch with the same plants employed in the pre-emergence tests. Growth was permitted to occur under artificial light, with irrigation provided by placing the pots in a small amount of water in stainless steel trays. After about ten days when the plants reached a suitable size, they were sprayed with formulation. Observations were made for ten days and an injury rating was given compared with the untreated controls. The injury ratings were made according to the following scales.

SEVERITY OF INJURY

| | |
|---|---|
| 0 None | 3 Moderately severe |
| 1 Slight | 4 Severe |
| 2 Moderate | 5 Death |

TYPE OF INJURY

| | |
|---|---|
| C—Chlorosis | R—Reduction |
| E—Epinasty | RG—Reduced germination |
| G—General necrosis | S—Stunting |
| H—Hypertrophy | SC—Stem curling |
| L—Local necrosis | SS—Stem swelling |
| M—Mottled | T—Tip burn |
| NF—Nodule formation | TB—Terminal bud |
| NG—No growth | U—Leaf curl upward |
| | W—Wilting |

Results are shown in the following table.

TABLE I

| Test plant | Mustard | | Pigweed | | Crabgrass | | Foxtail | | Corn | | Wheat | | Cotton | | Beans | |
|---|---|---|---|---|---|---|---|---|---|---|---|---|---|---|---|---|
| Emergence | Pre | Post | Pre | Post | Pre | Post | Pre | Post | Pre | Post | Pre | Post | Pre | Post | Pre | Post |
| Sample and dosage: | | | | | | | | | | | | | | | | |
| A,[1] 20 lb./acre | 4RG 4S | 5W | 5NG | 5W | 5NG | 5C | 5NG | 5C | 3SC | 5C | 0 | 4C | 0 | 5G | 0 | 5G |
| A,[1] 5 lb./acre | 2S | 5W | 0 | 5W | 2RG 2S | 4C | 4RG 3S | 5C | 1SC | 4C | 0 | 3C | 0 | 5G | 0 | 4G |
| B,[2] 20 lb./acre | 4RG 4S | 5W | 5NG | 5W | 4RG 4S | 5C | 5NG | 4C | 3SC | 4C | 0 | 4C | 0 | 5G | 0 | 5G |
| B,[2] 5 lb./acre | 3S | 5W | 0 | 5W | 4RG 4S | 4C | 4RG 4S | 3C | 0 | 4C | 0 | 3C | 0 | 5G | 0 | 4G |
| 2,4-D, 1 lb./acre | 4RG 4S | 3E 2G | 4RG 2S | 3E 2SC | 2S 2RG | 2NF 2T | 0 | 1T | 0 | 0 | 0 | 0 | 0 | 3E | 2SS 2SC | 5SC 5SS |
| Dachtal, 5 lb./acre | 2S | 0 | 3RG 3S | 0 | 5NG | 0 | 3SS 3S | 0 | 0 | 0 | 3SS | 0 | 0 | 0 | 0 | 0 |
| Untreated | 0 | 0 | 0 | 0 | 0 | 0 | 0 | 0 | 0 | 0 | 0 | 0 | 0 | 0 | 0 | 0 |

[1] N,N-dimethylaminomethyl tributyl tin.
[2] Cyclopentamethyleneaminomethyl tributyl tin.

These results show that at the dosage levels tested N,N-dimethylaminomethyl tributyl tin and cyclopentamethyleneaminomethyl tributyl tin have excellent pre- and post-emergent herbicidal effectiveness against weeds. In pre-emergent application, the selectivity of these organotin compounds for weeds, as opposed to crops, is comparable to that of 2,4-D and Dacthal, but post-emergence selectivity is only fair. Thus, in post-emergence applications of these compounds care should be taken that growth-controlling amounts of the compounds do not come into contact with desirable plants which are adversely affected by them. Substantially similar results to those obtained with N,N-dimethylaminomethyl tributyl tin and cyclopentamethyleneaminomethyl tributyl tin are obtained in the above experimental procedure when the herbicide is N,N-diethylaminomethyl tri-isopropyl tin, N,N-di-isopentylaminomethyl tripropyl tin, N,N-dibutylaminomethyl trioctyl tin, N,N-dihexylaminomethyl tridodecyl tin, N,N-didodecylaminomethyl trihexyl tin, N,N-diethylaminomethyl tri(3-pentenyl)tin or N,N-dimethylaminomethyl tributyl tin.

Example II

Compounds of Type II were tested for pre-emergence and post-emergence effectiveness in accordance with the procedures used in Example I with the following exceptions. The test compounds were applied at a dosage rate of 1 lb. and 20 lbs. per acre instead of 5 lbs. and 20 lbs. as used in Example I, and the Dacthal used at 5 lbs. per acre as a control herbicide in Example I was replaced by Atrazine (2-chloro-4-isopropylamino-6-ethylamino-1,3,5-triazine) at a dosage rate of 1 lb. per acre. Results are shown in the following table.

where each R is a straight or branched chain, saturated or unsaturated aliphatic group having from 1 to about 14 carbon atoms, or both R's taken together form a ring containing 4 to 7 carbon atoms, R' is a straight or branched chain, saturated or unsaturated aliphatic group having from 1 to about 14 carbon atoms, R'' is hydrogen or a straight or branched chain, saturated or unsaturated aliphatic group having from 1 to about 14 carbon atoms, and X is a salt forming anion.

2. The method of claim 1, wherein each R is a straight or branched chain, alkyl or alkenyl group having from 1 to about 6 carbon atoms or both taken together form a ring containing from 4 to 7 carbon atoms, R' is a straight or branched chain saturated or unsaturated alkyl group having from 1 to about 6 carbon atoms and R'' is hydrogen or a straight or branched chain, saturated or unsaturated alkyl group having from 1 to about 6 carbon atoms.

TABLE II

| Test plant | Mustard | | Pigweed | | Crabgrass | | Foxtail | | Corn | | Wheat | | Cotton | | Beans | |
|---|---|---|---|---|---|---|---|---|---|---|---|---|---|---|---|---|
| Emergence | Pre | Post | Pre | Post | Pre | Post | Pre | Post | Pre | Post | Pre | Post | Pre | Post | Pre | Post |
| Sample and dosage: | | | | | | | | | | | | | | | | |
| C,[1] 20 lb./acre | 0 | 5W | 0 | 5W | 0 | 5W | 0 | 5W | 0 | 5W | 0 | 2T | 0 | 3G | 0 | 4G |
| C,[1] 1 lb./acre | 0 | 5W | 0 | 0 | 0 | 1T | 0 | 2T | 0 | 3W | 0 | 1T | 0 | 1G | 0 | 1G |
| D,[2] 20 lb./acre | 0 | 5W | 0 | 5W | 2SC | 5W | 2SC | 5W | 0 | 5W | 0 | 3T | 0 | 5G | 0 | 5G 1G |
| D,[2] 1 lb./acre | 0 | 5W | 0 | 4W | 0 | 2T | 0 | 3W 3T | 0 | 2W | 0 | 1T | 0 | 1G | 0 | |
| 2,4-D, 1 lb./acre | 4RG 4S | 3E 4G | 4RG 2S | 3E 4G | 2RG 2S | 1T 2NF | 0 | 1T | 0 | 0 | 0 | 0 | 3S | 3E | 2SC 2SS | 5S 5S |
| Atrazine, 1 lb./acre | 2C 2S | 4G | 1C | 4G | 0 | 3T | 0 | 4T | 0 | 0 | 0 | 2T | 0 | 0 | 0 | 2G |
| Untreated | 0 | 0 | 0 | 0 | 0 | 0 | 0 | 0 | 0 | 0 | 0 | 0 | 0 | 0 | 0 | 0 |

[1] N-methyl cyclopentamethyleneammoniomethyl tributyl tin bromide.
[2] Cyclopentamethyleneammoniomethyl tributyl tin hydrochloride.

These results show that at the levels tested compounds of Type II have excellent post-emergence herbicidal effectiveness, but pre-emergence effectiveness is relatively poor. In general, the post-emergence selectivity of these compounds for weeds over the crops tested is only fair and therefore in post-emergence applications care should be taken that growth controlling amounts of these compounds do not come into contact wtih desirable plants which are adversely affected by them. Results substantially similar to those obtained with cyclopentamethyleneammoniomethyl tributyl tin hydrochloride and N-methyl cyclopentamethyleneammoniomethyl tributyl tin bromide are obtained in the above experimental procedure when the herbicide is N,N-dimethylammoniomethyl tributyl tin hydrochloride, N,N,N-triethylammoniomethyl tri-isopropyl tin chloride, N,N,N-tributylammoniomethyl trioctyl tin bisulfate, N,N,N-trihexylammoniomethyl tridodecyl tin bromide or N,N,N-triethylammoniomethyl tri-(3-pentenyl)tin chloride.

What is claimed is:

1. A method for controlling the growth of weeds which comprises contacting weeds with an amount sufficient to prevent, suppress or inhibit the growth of said weeds, of an organotin compound of the general formula

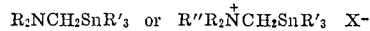

$R_2NCH_2SnR'_3$ or $R''R_2\overset{+}{N}CH_2SnR'_3$ $X^-$

3. The method of claim 2 wherein the organotin compound is N,N-dimethylaminomethyl tributyl tin.
4. The method of claim 2 wherein the organotin compound is cyclopentamethyleneaminomethyl tributyl tin.
5. The method of claim 2 wherein the organotin compound is cyclopentamethyleneammoniomethyl tributyl tin hydrochloride.
6. The method of claim 2 wherein the organotin compound is N-methylcyclopentamethyleneammoniomethyl tributyl tin bromide.

References Cited

UNITED STATES PATENTS 3,440,255  4/1969  Matsuda et al. _____ 260—429.7
2,893,857  7/1959  De Pree _____ 71—97

OTHER REFERENCES

Kostyanovskii et al.: Chem. Abst., vol. 62 (1965), 11843d.

LEWIS GOTTS, Primary Examiner
C. L. MILLS, Assistant Examiner

U.S. Cl. X.R.

71—88, 95, 97; 260—239 B, 270 R, 313.1, 429.7